United States Patent [19]

Schmidt et al.

[11] Patent Number: 5,224,783
[45] Date of Patent: Jul. 6, 1993

[54] RADIALLY AND AXIALLY LOAD-BEARING ROTARY SLIDING FRICTION BEARING FOR CHASSIS PARTS IN MOTOR VEHICLES

[75] Inventors: Elisabeth Schmidt, Lemförde; Klaus Kramer, Neuenkirchen, both of Fed. Rep. of Germany

[73] Assignee: Lemforder Metallwaren AG, Lemförde, Fed. Rep. of Germany

[21] Appl. No.: 902,962

[22] Filed: Jun. 23, 1992

[30] Foreign Application Priority Data

Jun. 24, 1991 [DE] Fed. Rep. of Germany ....... 4120772

[51] Int. Cl.⁵ ............................................. F16C 17/10
[52] U.S. Cl. .................................. 384/223; 384/222; 384/275
[58] Field of Search ............... 384/223, 222, 203, 275, 384/221, 220

[56] References Cited

U.S. PATENT DOCUMENTS

| 2,341,497 | 2/1944 | Amtsberg | 384/223 |
| 3,239,286 | 3/1966 | Harrison | 384/222 |
| 4,809,960 | 3/1989 | Kakimoto et al. | 384/222 |

FOREIGN PATENT DOCUMENTS

| 3804886C2 | 4/1990 | Fed. Rep. of Germany. |
| 4037966A1 | 6/1992 | Fed. Rep. of Germany. |

*Primary Examiner*—Lenard A. Footland
*Attorney, Agent, or Firm*—McGlew & Tuttle

[57] ABSTRACT

The radially and axially load-bearing rotary sliding friction bearing for chassis parts in motor vehicles includes a rigid inner bushing (1) and an outer bushing (2), which is rotatable relative to it and is arranged in an elastomeric body (3) that adheres to it. Both bushings have, at least on one axially outer end, axial bearing surfaces at one radially directed flange projection (6, 7) each, wherein the flange projection associated with the outer bushing (2) is provided on an annular axial bearing on a sliding disk (7) and on a support ring (8) pressed onto the adjacent tubular end of the outer bushing (2). The sliding disk and the clamping ring are connected to one another by an elastomeric material in an adhering manner.

5 Claims, 1 Drawing Sheet

FIG. 1
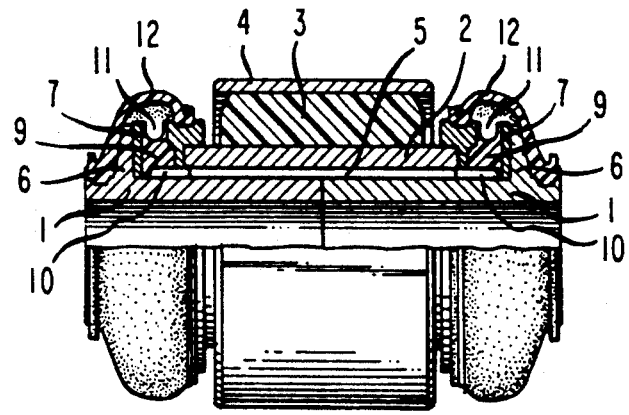
FIG. 2
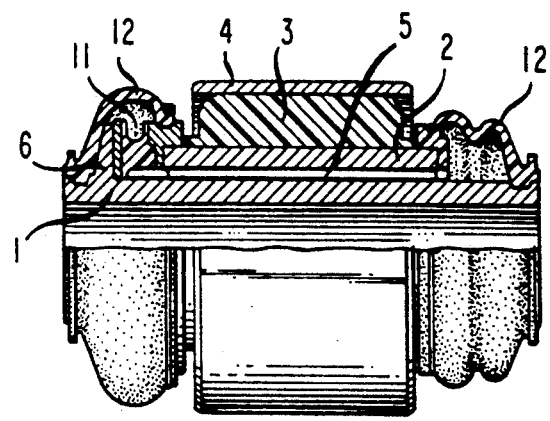
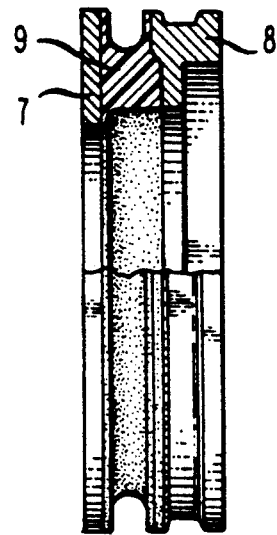
FIG. 3

RADIALLY AND AXIALLY LOAD-BEARING ROTARY SLIDING FRICTION BEARING FOR CHASSIS PARTS IN MOTOR VEHICLES

FIELD OF THE INVENTION

The present invention pertains to a radially and axially load-bearing rotary sliding bearing for chassis parts in motor vehicles, in which an inner rigid inner bushing is arranged rotatably in an outer bushing, the outer bushing being arranged in an elastomeric body that adheres to the outer bushing, each bushing having a radially directed flange projection defining an axial bearing surface on at least one axially outer end, wherein the axial bearing surface associated with the outer bushing is provided at a sliding disk that is elastically supported against the elastomeric body.

BACKGROUND OF THE INVENTION

DE 38,04,886—C2 discloses such a bearing, above all for guard rails, in which an outer bushing made of rubberized metal is arranged, with its inner metal sleeve, directly on the outer sliding surface of the inner bushing, and is inserted, with the outer rubber body, in a bearing eye of the motor vehicle part. The inner bushing has, on one side, a radially extending flange projection with an axial bearing surface, whose axial opposing surface is provided on a sliding disk, which is elastically supported axially against the rubber body that externally surrounds the axial bearing surfaces. Such rotary sliding bearings are mounted in pairs in mirror-inverted position and are tensioned against each other by a bolt passing through the inner bushings. This document also discloses sliding surfaces with a coating made of polytetrafluoroethylene (PTFE).

The older patent application P 40,37,966.3-21 pertains to an arrangement, in which the outer bushing and the radial flange projection associated with it are connected to one another by an intermediate member that adheres to both, so that the bearing can be designed with an axial spring characteristic that is independent of the radial spring characteristic.

SUMMARY AND OBJECTS OF THE INVENTION

In contrast, the object of the present invention is to design a radially and axially load-bearing rotary sliding bearing of the class described in the introduction, with mutually independentradial and axial spring characteristics, in such a way that the largest possible number of components can be used to construct a rotary sliding bearing with different unilateral and bilateral axial damping in order to keep the production costs low without deterioration of the elastic properties and with the greatest possible option for variations.

According to the invention, a radially and axially load-bearing rotary sliding friction bearing for chassis parts in motor vehicles, is provided. The bearing includes an inner bushing arranged rotatably in an outer bushing. The outer bushing is arranged in an elastomeric body that adheres to the outer bushing. Each of the bushings have axial bearing surfaces on at least one axially outer end. The axial bearing surface associated with the outer bushing is provided at a sliding disk that is axially elastically supported against the elastomeric body. An annual axial bearing is provided formed of a sliding disk and a clamping ring are attached to an end of the outer bushing. Each of the sliding disk and the clamping ring are connected to one another by an elastomeric material to a prefabricated, axially and radially elastic component. The sliding disk, the clamping ring and the elastomeric component is inserted between an flange projection of the inner bushing and an adjacent end of the outer bushing.

Separate design of the radially elastic and axially elastic components is achieved according to the invention, so that the spring characteristic in the axial direction can deviate from the spring characteristic in the radial direction. The outer bushing, the elastomeric body, and further components can also be used for rotary sliding bearings without axial damping, so that a considerable advantage is achieved in production in terms of increased efficiency. It is particularly advantageous that such a bearing can be supplied in completely assembled state and can subsequently be mounted.

A design, in which the sliding disk and the clamping ring are connected by a support ring that is made of an elastomeric material and adheres to both, is preferred. Such a design has the advantage that the axial bearing is manufactured as a separate component and can be designed in adaptation to the operation conditions acting on the bearing. This makes it possible to construct rotary sliding bearings with different axial spring characteristics due to the use of axial bearings with different properties by using otherwise identical components. One particular advantage is the fact that different axial spring characteristics can be obtained on the two sides of the bearing in rotary sliding bearings with bilateral axial bearing by using axial bearings with different properties.

To achieve the simplest possible design and mounting, the clamping ring of the axial bearing, which is otherwise manufactured separately, is placed on the adjacent, tubular end of the outer bushing with a complementarily profiled stepped recess, so that centering for correct seating of the axial bearing is automatically achieved at the time of mounting.

Another advantage is the fact that the radial bearing surfaces of the axial bearing can be covered by a sealing bellows, one end of which is attached to the inner bushing outside the radial bearing surface, and the other end of which is attached to the circumference of the clamping ring. This considerably simplifies the manufacture of the elastomeric body intended for ensuring axial spring deflection.

The characteristics of the present invention can be applied to rotary sliding bearings with unilateral and bilateral axial damping.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partially sectional view showing a rotary sliding bearing with an axial bearing on both sides as a view in the lower half and as a longitudinal section in the upper half;

FIG. 2 is a partially sectional view showing a rotary sliding bearing with a unilateral axial bearing as a view in the lower half and as a longitudinal section in the upper half; and FIG. 3 is a partially sectional view showing an axial bearing design as a view in the lower half and as a section in the upper half on a scale larger than that of FIGS. 1 and 2.

DETAILED DESCRIPTION OF THE PREFERRED EMBODIMENT

In the exemplified embodiments represented in FIGS. 1 and 2, the radially acting bearing part consists of the inner bushing 1 and the outer bushing 2. The outer bushing 2 is arranged within an elastomeric body 3, which is inserted into a mounting bushing 4 in an adhering manner. To improve the sliding properties, a sliding bushing 5, whose inner surface, which may have a coating to improve the sliding properties if desired, is in direct contact with the opposite sliding surface on the outer jacket of the inner bushing 1, is arranged in the outer bushing 2. The outer bushing 2 is connected, at both ends in the example shown in FIG. 1 and at only one end in the example shown in FIG. 2, by an axial bearing, which is represented in FIG. 3 on an enlarged scale. The axial bearing cooperates with a radially extending flange projection 6 of the inner bushing 1, so that the inner bushing 1 must be divided in the case of bilateral arrangement of an axial bearing according to FIG. 1 in order to make it possible to mount the inner bushing 1 from both outer sides. A pin, not shown in the drawing, passes through the inner bushing and tensions both parts with each other. The axial bearing according to FIG. 3 consists of a sliding disk 7 and a clamping ring 8, both of which are connected to one another by a support ring 9 made of an elastomeric material in an adhering manner. The sliding disk 7 forms, on the outside, an axial bearing surface, which cooperates with the axial bearing surface on the flange projection 6 of the inner bushing 1. During mounting, the clamping ring 8 can be pressed onto the adjacent tubular end of the outer bushing 2 with a stepped recess, and is automatically centered as a result. After the axial bearing has been mounted on one side or on both sides, the inner bushing or the inner bushings is/are pushed in. The adaptation of the length of the outer bushing to the axial bearings pressed on and to the two inner bushings must ensure a slight pre-tension during mounting. As a result, a continuous characteristic curve without play during zero crossing during a change in axial load is achieved. Due to the equalization of the length, it is not necessary to particularly limit the tolerances of the components. Under axial loading, the pressure-loaded axial bearing will make possible an axial movement of the inner bushing 1 corresponding to the spring characteristic. An axial sliding movement takes place between the sliding bushing 5 and the inner bushings 1. The axial rigidity of the elastomeric body 3 does not act. The axial bearing located opposite the application of the load is lifted off from the axial bearing surface of the flange projection after elimination of the axial twisting. The axial spring rate is thus determined only by the rigidity of the pressure-loaded axial bearing. The volume displacement brought about by the spring deflection of the axial bearing is made possible by the free space 10 between the inner bushing 1 and the support ring 9 or the clamping ring 8. A marked increase in the axial spring rate of the axial bearing can be achieved by a circular recess 11, whose lateral limits touch each other after a predetermined axial displacement and act as a stop. Dirt is prevented from entering into the bearing surfaces at both bearing ends by a sealing bellows 12, which is fastened, with one end, in an annular recess of the inner bushing 1 and, with the other end, in an annular recess of the clamping ring 8 or directly to the end of the outer bushing 2. The sealing bellows 12 extends over the axial bearing and especially the axial bearing surfaces that touch each other, so that attachment to the inner bushing is outside the radially directed flange projection. The attachment of the bellows ends can be secured by known means.

While specific embodiments of the invention have been shown and described in detail to illustrate the application of the principles of the invention, it will be understood that the invention may be embodied otherwise without departing from such principles.

What is claimed is:

1. A radially and axially load-bearing rotary sliding friction bearing for chassis parts in motor vehicles, comprising: an outer bushing; an inner bushing, said inner bushing being arranged rotatably in said outer bushing, said outer bushing being arranged in an elastomeric body, adhered to said elastomeric body, each bushing having an axial bearing surface on at least one axially outer end, said inner bushing axial bearing surface being in the form of a radially directed flange projection, said outer bushing axial bearing surface being provided as a sliding disk, said sliding disk cooperating with a clamping ring to form an annular axial bearing, said sliding disk being connected to said clamping ring by an elastomeric material, said annular axial bearing being positioned between said flange projection of the inner bushing and an adjacent end of said outer bushing.

2. A rotary sliding bearing according to claim 1, wherein said sliding disk and said clamping ring are connected by a support ring support formed of said elastomeric material, said support ring being adhered to each of said sliding disk and said clamping ring.

3. A rotary sliding bearing according to claim 1, wherein said support ring is pressed onto said adjacent end of said outer bushing and includes a complimentary profiled stepped recess.

4. A rotary sliding bearing according claim 1, wherein a sealing bellows is provided extending over axial bearing surfaces including said outer bushing adjacent end and said flange projection, one end of said sealing bellows being connected to said inner bushing outside the axial bearing surfaces and another end of said sealing bellows being connected to a circumference of said clamping ring.

5. A rotary sliding bearing according to claim 4, wherein the case of a unilateral arrangement of the axial bearing, an opposite sealing bellows is arranged with its inner end in sliding contact with an end of said outer bushing.

* * * * *